Figure 1:
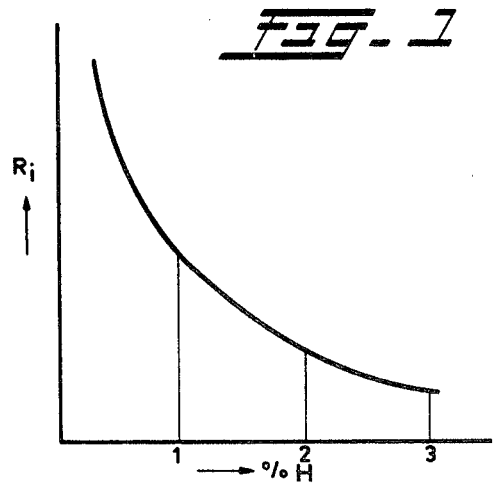

United States Patent

[11] 3,596,176

| [72] | Inventor | Robert Ronald Laupman<br>Wijchen, Netherlands |
|---|---|---|
| [21] | Appl. No. | 651,263 |
| [22] | Filed | July 5, 1967 |
| [45] | Patented | July 27, 1971 |
| [73] | Assignee | N.V. AUCO<br>Wijchen, Netherlands |
| [32] | Priority | July 8, 1966 |
| [33] | | Netherlands |
| [31] | | 6609,627 |

[54] ELECTRONIC CAPACITIVE MOISTURE INDICATOR INCLUDING OSCILLATOR POSITIVE FEEDBACK MEANS
9 Claims, 2 Drawing Figs.

[52] U.S. Cl. .................................................. 324/61,
331/65
[51] Int. Cl. ...................................................... G01r 27/26
[50] Field of Search............................................ 324/61, 57
A, 61 M, 61 TO; 331/65; 73/304 C

[56] References Cited
UNITED STATES PATENTS

| 2,373,846 | 4/1945 | Olken | 324/61 |
|---|---|---|---|
| 3,254,333 | 5/1966 | Baumoel | 73/304 X |
| 3,344,668 | 10/1967 | Schuck | 73/304 |
| 1,822,604 | 9/1931 | Simons et al | 324/61 |
| 3,252,086 | 5/1966 | Lundstrom | 324/61 |
| 3,204,179 | 8/1965 | Fuller | 324/62 X |
| 3,295,042 | 12/1966 | Evalds et al | 324/61 X |
| 3,331,019 | 7/1967 | Irwin | 324/61 |

FOREIGN PATENTS

| 34,908 | 1/1966 | Finland | 324/61 |
|---|---|---|---|

*Primary Examiner*—Edward E. Kubasiewicz
*Attorney*—Diller, Brown, Ramik & Holt

ABSTRACT: Electronic capacitive moisture indicator, comprising a transistor oscillator system including a measuring capacitor and a source of energy, a measuring system and a suitable envelope, characterized in that said measuring capacitor is formed as a plate-type capacitor and is included in the oscillator feedback, whereby the alternating voltage of the oscillator varies in dependence on the capacity of the measuring capacitor, and that said measuring capacitor is so dimensioned that said alternating voltage approaches zero in the absence of an object to be measured, that the maximum capacity between the measuring system and the transistor oscillator without the capacitor plates on the one hand, and the mass of the object to be measured or part thereof, including the user, on the other hand, is no more than about 5 to 10 picofarad, that said envelope is so dimensioned that the maximum capacity during the measurement by the user can be varied by no more than about 2 to 5 picofarad when said envelope is approached or contacted, and that said source of energy is a battery.

PATENTED JUL 27 1971

3,596,176

INVENTOR.
Robert Ronald Laupman
BY
Mason, Porter, Diller & Brown
ATTORNEYS

ELECTRONIC CAPACITIVE MOISTURE INDICATOR INCLUDING OSCILLATOR POSITIVE FEEDBACK MEANS

This invention relates to an electronic capacitive moisture indicator comprising a transistor-oscillator system including a measuring capacitor and a source of energy, a measuring system, and an appropriate envelope.

It is known that in the case of porous substances having good insulating characteristics, the apparent dielectric constant is increased by the presence of water or other liquids, ionized to a greater or less extent, in the pores of such porous substances. This property is utilized in the art for measuring or indicating the moisture content of certain substances. In it, use is made of a measuring capacitor with the substance to be measured serving as the dielectric. The change in measured capacity is an indication as to the moisture content of the substance concerned. The measuring capacitor may be a plate-type capacitor having two opposed plates between which the substance to be measured is placed, or the two plates are disposed in one plane and are brought into contact with the substance to be measured, either directly or indirectly. The measuring capacitor with the dielectric commonly forms part of a bridge which is fed with AC voltage, and the capacity of the measuring capacitor is measured in the conventional way. Thus, Netherlands Pat. application No. 247,250 discloses a measuring device comprising a Blumlein bridge, fed with high frequency voltage, the output winding of the bridge being connected to a phase-sensitive detector, the polarity of the output direct current of the detector being determined by the capacity between the measuring electrodes being higher or lower than that of a reference capacitor, the magnitude of the output direct current being dependent on the magnitude of the capacity difference.

The disadvantage of this and other devices is, that they are too complicated to be used as a universal moisture indicator by unskilled persons, because the indication obtained can readily give rise to an incorrect interpretation. If such a device could be rendered suitable for universal use at all, its cost price would be prohibitive for many uses. In addition, it is difficult for such devices to be so dimensioned that they are handy and readily portable. Another disadvantage of conventional capacitive moisture meters concerns the following. Generally speaking, the ohmic resistance of an insulating substance depends on the moisture content of such substance as shown graphically in FIG. 1. As the apparent dielectricity constant of the substance to be measured exhibits a similar characteristic in dependence on the moisture content, a conventional capacitive moisture meter, in which the scale has a linear relation to the capacity of the measuring capacitor, will exhibit the greatest measuring sensitivity at very low moisture percentages, but such sensitivity will decrease markedly with higher percentages. As, for example, in the case of concrete, the sharpest curvature occurs at as little as 1 percent moisture, there is no longer a great sensitivity in the very range in which information is of interest (between 1 and 5 percent).

The present invention provides a surprising solution for these problems. It is an object of the invention to provide a capacitive moisture indicator which is compact, handy, easily used by laymen, suitable for universal use, and whose sensitivity remains sufficiently high throughout its effective range.

According to the invention, this is achieved by including the measuring capacitor, which is formed as a plate-type capacitor, in the oscillator feed back, the AC voltage across the oscillatory circuit thereby varying in dependence on the capacity of the measuring capacitor, and by so dimensioning the measuring capacitor that said AC voltage approaches zero in the absence of an object to be measured, and by causing the maximum capacity between the measuring system and the transistor-oscillator without the capacitor plates on the one hand, and the mass of the object to be measured or part thereof including the user on the other hand, to be no more than about 5 to 10 picofarads, and by so dimensioning the envelope that the maximum capacity during the measurement by the user can vary by no more than about 2 to 5 picofarads upon approach of, or contact with, the envelope said source of energy being a battery.

The invention will be further described with reference to the accompanying drawings. In said drawings, FIG. 1 shows a characteristic curve showing the relation between the internal resistance and the moisture (H) of a material, such as, for example, concrete; and FIG. 2 shows a preferred embodiment according to the invention.

Figure 2:
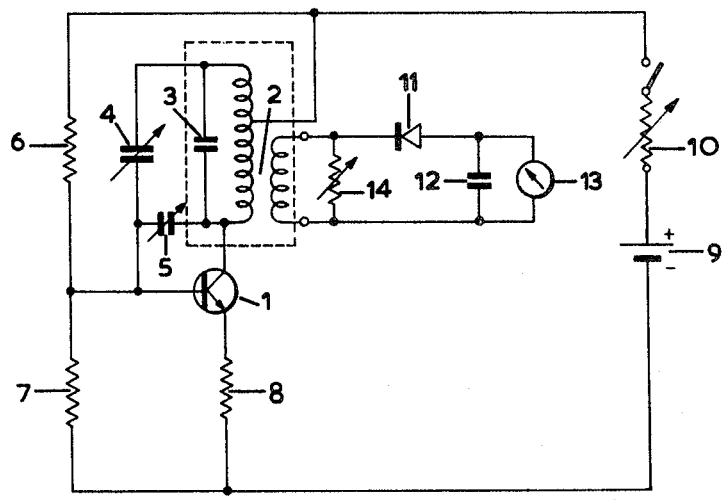

In the embodiment illustrated in FIG. 2, according to the invention, use is made of modification of a tuned transistor oscillator, which is renowned for the relatively high voltages which can be generated in the oscillator coil. The oscillator system consists of transistor 1, oscillator coil 2, the primary and secondary windings constituting a whole and the coil 2 being coupled to the measuring system through an auxiliary winding, capacitor 3, which together with the oscillator coil constitutes the oscillating circuit, measuring capacitor 4, consisting of two measuring plates disposed in one plate, capacitor 5, resistors 6 and 7, which provide a voltage division, emitter resistor 8, transistor battery 9, and a combined rheostat on-off switch 10. The measuring system consists of an auxiliary winding of the oscillator coil, diode 11, capacitor 12, measuring instrument (in this case a moving-coil instrument) 13 and variable resistor 14.

The circuitry according to the invention is as follows: the base of the transistor 1 is connected to voltage divider 6, 7, and provided with emitter resistor 8, the collector being connected to the primary winding of the oscillator coil 2. The primary winding is on the other end connected with 6 and the positive supply voltage. The second winding of the coil, which is directly plus-connected, is connected to the base through the measuring capacitor 4. The coil winding is tuned by means of the capacitor 3. In order to secure proper zero position, the dampening of the oscillation can be carried out by means of trimmer capacitor 5. Through a separate auxiliary winding on the coil 2, the resulting alternating voltage is rectified by means of the diode 11 and the capacitor 12, and measured by meter instrument 13, which may, for example, take the form of a moving-coil instrument. The dampening resistor 14 across the coupling winding enables a series of instruments to be calibrated relative to each other. The feed voltage is produced by means of a small battery 9 with a series-connected variable resistor and a zero switch 10. By virtue of this arrangement, the battery voltage can be corrected at all times, and the user is reminded that the apparatus should be calibrated before he proceeds to a measurement.

An important difference between the moisture indicator according to the invention and one of the conventional type is that, in the latter, the capacity of the measuring capacitor is measured, directly or indirectly, by an independent measuring system, whereas, in the apparatus according to the invention, the varying capacity of the measuring capacitor is to be regarded as one of the parameters of a system which is variable as a whole. Accordingly, the characteristics of the system as a whole can be adapted to the measurement. By properly selecting the dimensions of the transmission ratio between collector and feedback coil, it is obtained that the voltage across the oscillating circuit increases gradually with an increasing moisture, and approaches zero when the measuring capacity approaches zero. The feature that the oscillator is then stopped and capable of restarting gradually in response to the noise of the preadjusted quiescent current as soon as the capacity is again slightly increased, renders this solution according to the invention extremely suitable for moisture measurements. In addition, by so dimensioning the measuring capacity in the open condition that there is just no oscillation, the calibration of the zero position is rendered entirely superfluous, which is a great advantage in the case of measurements by unskilled persons.

The measuring system of the apparatus according to the invention consists of a simple rectifier comprising a diode rectifier 11, a capacitor 12, a suitable microammeter 13, and a variable resistor 14. The disadvantage that a smooth starting up of the oscillator is hampered by the dampening of the auxiliary coil of the measuring system can be overcome, according to the invention, by selecting a diode with such a choice of starting characteristic that the diode is still practically nonconductive at a low alternating voltage on the winding of the auxiliary coil. As a result, the dampening caused by the measuring system on the oscillating circuit is still very small in the case of initial oscillation. Accordingly, the oscillator can start freely. Conversely, in the case of minute oscillation of the oscillator, there is practically no current through the measuring system, so that no critical zero position arises. This is a great advantage in the mass manufacture of such measuring apparatuses.

The sensitivity of the resulting circuit is at frequencies above about 100 kHz. remarkably high: the initial sensitivity is in the order of 0.5 pf., while full-scale deflection can already be achieved at a coupling capacity of 10 pf. This renders it possible to accommodate the meter arrangement, including the source of power, in a compass not exceeding a pack of cigarettes.

The high sensitivity of the meter arrangement according to the invention renders it necessary to take precautions against parasitic capacities of the circuit relative to the object to be measured. Since the user is commonly electrically or capacitively connected with said object, the former is involved therein. Where the apparatus according to the invention is not earth-connected, the occurring parasitic capacities should be kept small to prevent errors in measuring. According to the invention, the oscillator system and the measuring system are therefore dimensioned as small as possible within the insulating envelope. In addition, it is necessary to use battery feed since the battery, too, functions as a capacitive pole relative to the object to be measured and the user. The circuit can be adjusted to a lower no-load current function, so that it is even possible to use a small, single 1½ volts battery cell. The sensitivity to these parasitic capacities relative to the object to be measured can be explained by the fact that these partly short circuit the coupling windings of the oscillator coil or become parallel with them, or attenuate the base input. They can thus detune the oscillator and/or attenuate it which affects the result of the measurement. Compensation of the battery voltage and temperature fluctuations is provided by using a variable resistor with a coupled switch 10 so that the user is forced first to calibrate the instrument at full-scale deflection after it has been switched on. An effective calibrating object is the hand, which is a rough approximation to a thin metal plate as a cover for the plates, which are preferably disposed in one plane.

The moisture indicator according to the invention has a reaction sensibility of less than 0.5 pf., even with a battery voltage of 1½ volts, at which an effective measuring depth of as much as 5 cm. in the material to be measured was achieved with capacitor plates located in one plane.

The instrument thus obtained can be built in extremely small compass by virtue of its surprising simplicity and its very low current consumption. The moisture indicator is constructed in pocket format, and thus satisfies the great existing demand in this field, which is hardly, if at all, satisfied by apparature employing a conventional circuit with a measuring bridge, which are moreover of an unduly high cost price range.

The apparatus according to the invention gives a reliable indication of the moisture content of concrete, wood, ceramics, board, paper, textile, flour, chemicals, cereals, bread and other bakery products, hay and the like, and synthetic materials, while it is also capable of supplying a reproducing information, with a suitable tolerance, with respect to emulsions.

Its general range of applications resides in indicating the change of the dielectric constant of a dielectric owing to external influences. The circuit is easily adapted to such uses, whereupon the scale of the meter can be calibrated accordingly.

I claim:

1. An electronic capacitance moisture indicator comprising an electron discharge device, oscillator means including an oscillator coil connected between an output electrode and a common electrode of said electron discharge device for providing oscillatory output signals of varying magnitude and including a positive feedback circuit means, said oscillator means being responsive to variations in the electrical characteristics of said feedback circuit means to provide variations in the magnitude of said output signals, said feedback circuit means comprising moisture sensitive variable capacitance means conductively connected between said coil and an input electrode of said electron discharge device for increasing the capacitance thereof in response to increases in moisture in proximity to said capacitance means and for varying the electrical characteristics of said feedback circuit means to vary the magnitude of said output signals, and detection means coupled to said oscillator for detecting said output signals and indicating the level of moisture proximate said capacitance means.

2. An indicator according to claim 1, further comprising a battery, a variable resistor and a switch connected to said oscillator, said variable resistor and switch being series-connected with said battery, and manual adjustment means connected with said variable resistor and switch for simultaneously compensating for the voltage variations of said battery, the residual heat dependency of the oscillator and said detection means, and the manufacturing tolerance of the constituent parts of the indicator.

3. An indicator according to claim 1, wherein said oscillator includes said oscillator coil, said detection means comprising a secondary winding coupled to the oscillator coil, a diode, a capacitor, and a voltage meter, said diode and capacitor being electrically connected between said secondary winding and said voltage meter for providing a moisture level indication.

4. An indicator according to claim 3, wherein said diode has such a characteristic as to thereby shift the measuring characteristic of the indicator downwardly.

5. Apparatus according to claim 1, wherein said electron discharge device is a constituent transistor and said oscillator coil forms part of a transformer having a secondary winding and is coupled to said secondary winding; a variable calibrating resistor is connected across said secondary winding of the oscillator to compensate for part of the tolerances of the constituent transistor and other parts of said indicator.

6. Apparatus according to claim 1, wherein said electron discharge device is an oscillator transistor, a variable capacitor conductively connected to the collector and the base of the oscillator transistor, said capacitor being manually adjustable, said capacitor providing means for altering the starting sensitivity and the measuring sensitivity of the indicator o adapt said indicator to the specific dielectric constant and the moisture content range of the material to be measured.

7. An indicator according to claim 1 wherein said moisture sensitive capacitance means comprises a capacitor including first and second spaced capacitor plates, said first plate being conductively connected to said coil and said second plate being conductively connected to said input electrode, said capacitor being responsive to the presence of moisture proximate said plates to increase the capacitance thereof, and said oscillator means being responsive to an increase in the capacitance of said capacitor for increasing the magnitude of said output signals.

8. An indicator according to claim 1 wherein said capacitance means decreases to a minimum capacitance in the absence of moisture in proximity thereto for halting oscillation by said oscillator means.

9. An indicator according to claim 1 wherein the component parts of said oscillator means and detection means are closely arranged and housed within an insulating envelope to reduce capacitive interference with the indication of said detection means.